3,166,607
READILY DYEABLE COMPOSITIONS COMPRISING POLYPROPYLENE CONSISTING PREVAILINGLY OF ISOTACTIC MACROMOLECULES AND METHOD OF PREPARING SAME
Enrico Cernia and Alberto Bonvicini, both of Terni, Italy, assignors to Montecatini Societa Generale per l'Industria Mineraria e Chimica, Milan, Italy
No Drawing. Filed Feb. 11, 1958, Ser. No. 714,495
Claims priority, application Italy Feb. 19, 1957
7 Claims. (Cl. 260—878)

This invention relates to polymeric alpha-olefins having modified properties. More particularly, the invention relates to polymeric alpha-olefins having other polymeric chains substantially homogeneously grafted on the macromolecules thereof and which exhibit modified properties, especially improved dyeing characteristics as compared to the dyeing properties of the alpha-olefin polymers per se.

The production of polymers of alpha-olefins $$CH_2=CHR$$

where R is a hydrocarbon radical, which polymers are linear, regular head-to-tail but have two entirely different steric structures have been disclosed, and have been identified as "isotactic" and "atactic," respectively. "Isotactic" identifies the regular structure in the macromolecule of an alpha-olefin polymer characterized in that, assuming the main chain of the macromelcule to be fully extended in a hypothetical plane, the R groups attached to the tertiary asymmetric carbon atoms of adjacent monomer units occur, on the same chain section, on one side of the plane and the hydrogen atoms bound to those carbon atoms occur, on said chain section, on the opposite side of the plane. While the term "isotactic" is not synonymous with "crystalline," since the isotactic structure exists regardless of the physical state of the polymer, i.e., whether it is in noncrystalline or crystalline condition, under appropriate conditions the isotactic polymers are crystalline and, if highly isotactic, are highly crystalline.

The isotactic polymers may be produced in admixture with atactic (amorphous, noncrystallizable) polymers, and the two types of polymers can be separated on the basis of their different steric structures, by means of selective solvents.

It has also been shown that by using specially selected catalysts, polymerization of the alpha-olefins can be oriented to the direct production of polymerizates which consist, at least prevailingly, of isotactic macromolecules, that is of macromolecules having substantially the isotactic structure.

The polymeric alpha-olefins which are modified and, in certain respects improved, according to the present invention consist at least prevailingly (over 50%) of the isotactic macromolecules.

The polymeric alpha-olefins, and particularly polypropylenes which consist prevailingly to substantially of isotactic macromolecules, have many extremely valuable properties and are useful for many purposes including the production of shaped articles. However, the low water absorbing capacity of the polypropylene complicates dyeing thereof.

One of our objects is to provide a new method for improving the dyeing and other characteristics of prevailingly to substantially isotactic polypropylene.

Another object is to provide the new modified polymers and shaped articles thereof which are modified in depth, and not only superficially.

These and other objects are accomplished by the present invention in accordance with which grafts of modifying polymers are distributed uniformly in and on at least prevailingly isotactic polypropylene by heating the latter at a temperature above its melting point in the presence of a polymerizable monomer which, during the heating, forms modifying polymeric chains which are bound chemically to the macromolecules of the polypropylene.

In practice, the polymerizable monomer may be mixed with the polypropylene (with or without previous peroxidation of the latter) and the mixture may be melted and extruded to form shaped articles such as filament, films, tapes, tubes, etc.

A variety of polymerizable monomers may be mixed with the polypropylene prior to melting and extruding the same, including vinyl aromatic monomers such as styrene, divinylbenzene, and/or substituted styrenes or divinylbenzenes, as well as polymerizable derivatives of unsaturated carboxylic acids containing a small number of carbon atoms, e.g., polymerizable derivatives of such acids containing from 3 to 4 carbon atoms, and including maleic, fumaric and acrylic acids. Polymerizable derivatives such as the esters, halides, amides, nitriles and so on of those acids can be used. The polymerizable monomers can be used in admixture.

The amount of polymerizable monomer mixed with the polypropylene may be from 1 to 25% by weight. In a preferred embodiment, the mixture comprises 10 parts of the polymerizable monomer to 90 parts of the polypropylene.

The mixture is first melted by heating it to a temperature above the melting point of the at least prevailingly isotactic polypropylene, usually at a temperature between 170° C. and 250° C. for at least five minutes, care being taken that the polypropylene is not degraded during the heating.

Suitable extrusion temperatures for the melt are between 140° C. and 250° C.

At these temperatures, a number of free radicals are formed as a result of the action of the heat. Such free radicals function to promote polymerization of the polymerizable monomers the homopolymers of which are readily dyeable and effect an appreciable chain transfer, thus linking the polymeric molecules together.

Since the free radicals are formed during the heating, peroxidation of the polypropylene is not essential for the purpose of insuring a supply of active oxygen for initiating free radical polymerization of the styrene or other polymerizable monomer mixed with the polypropylene, and to provide loci for grafting on of the polystyrene or like polymeric chains.

However, it is advantageous to introduce peroxide or hydroperoxide groups into the polypropylene, before mixing it with the polymerizable monomer, especially if a very frequent or uniform occurrence on the polypropylene chain of the polymeric chains derived from the polymerizable monomer is desired.

The peroxidation can be carried out in any suitable way. The simplest, most convenient method involves subjecting the polypropylene to the action of gaseous mixtures containing molecular oxygen, e.g., air, at temperatures above 50° C. The peroxidation, when performed, is continued until the number of peroxide or hydroperoxide groups associated with the polypropylene is such as to insure the supply of between 0.1% and 1.0% of active oxygen for initiating or promoting polymerization of the polymerizable monomer during extrusion of the melt.

Homogenation of the mixture of particulate polypropylene and the polymerizable monomer or mixture of polymerizable monomers can be effected in any appropriate manner, as for example by mixing the components in a ball mill, a Werner type mixer, or other similar apparatus.

The homogeneous mass is fed from the mixer into the extruder in which it is melted and in which the polymeric chains of the modifier are grafted onto the polypropylene chains. The mass comprising the resulting graft copolymer is then extruded to obtain the article of desired shape.

Under the conditions described, the graft copolymer is completely or prevailingly homogeneous and there is no grafting of the modifying polymer chains at preferred localized areas, such as the preferential grafting at or near the surface which occurs if the polypropylene is modified after it has been formed into a shaped article. Articles formed by extrusion of the graft copolymer are modified in depth or throughout their cross-section.

In the instant method, the grafting occurs as a result of subjecting the mixture to the high temperature required for melting the polypropylene and in such a way that the modifying polymeric chains, for example the polystyrene chains, are very short and uniformly distributed.

The shaped articles formed by extrusion of the graft copolymers also exhibit homogeneous and uniform characteristics. For example, the absorption of dyes by these articles is not restricted to the surface thereof and the dye is absorbed with equal intensity at the surface and throughout the cross-section of the article. The danger of rubbing off and/or migration of the dye during use of the article is thereby entirely eliminated.

It is advantageous, since improved grafting results, to pre-form the homogeneous powdered mixture or melt of the polypropylene and polymerizable monomer in the shape of small cylinders or chips, intermediate the mixing or the mixing and melting of the components, prior to final extrusion thereof.

Yarns, tapes, films, etc. formed of the graft copolymers can be subjected to prolonged extraction with solvents having selective solubility for the residual non-grafted modifying polymer, such as non-grafted polystyrene, polyacrylonitrile, etc., which is usually present, at temperatures of, preferably, around 50° C., without decrease in the dyeing capacity of the articles. This shows that the imroved dyeing and other characteristics of the polypropylene are realized exclusively because the modifying polymer is grafted on the polypropylene. Further evidence that the grafted modifying polymer is responsible for the improved dyeing capacity of the articles of this invention is found in the fact that the dye affinity of articles obtained by extruding a mixture of polypropylene and polystyrene (in the same ratios as those polymers exist in the grafted polymers) is no better than the dye affinity of similar articles formed wholly of the polypropylene.

The following examples are given to illustrate specific embodiments of the invention, it being understood that these examples are not intended as limiting.

*Example 1*

900 g. prevailingly isotactic polypropylene having an intrinsic viscosity of 1, are peroxidized in an oven heated to 75° C. by circulating air therein until the amount of hydroperoxide groups introduced into the polypropylene corresponds to 0.5% by weight.

The peroxidized polypropylene is then mixed in a ball mixer at ordinary temperature, with 100 g. freshly distilled styrene, and the mixture is melted and extruded in a melting spinning plant, under the following conditions:

| | ° C. |
|---|---|
| Temperature of the screw | 200 |
| Temperature of the head | 155 |
| Temperature of the spinneret | 145 |

Permanence time of the molten mass in the extruder: 15 mins.

Spinnerets having 18 holes with 0.2 mm. diameter are employed. The spinning proceeds smoothly and the filaments obtained are stretched with a ratio of 1:4.

The finished yarn has the following characteristics:

| | |
|---|---|
| Strength g./den | 2.9 |
| Elongation percent | 29 |

A 20 g. skein of this yarn is then dyed for 1½ hours, by boiling it in a bath containing Setacyl Yellow 3 G (C.I. Disperse Yellow 20) according to known methods. The color obtained is very intense and has very good fastness.

If a similar but undyed skein is subjected to a long extraction (75 hours at 50° C.) with a 50%:50% benzene-acetone mixture, in order to remove the polystyrene eventually present therein, and then dyed under the conditions described herein, a fast and brilliant color is also obtained.

*Example 2*

A mixture of non-peroxidized crystalline (isotactic) polypropylene having an intrinsic viscosity of 1.5, and styrene in a 90:10 weight ratio, is prepared as in preceding Example 1. The perfectly homogeneous mixture is then introduced into an extruder heated to 220° C. and maintained at this temperature for 15 minutes. After this time the grafting reaction is completed and the polymer is spun under the following conditions:

| | ° C. |
|---|---|
| Temperature of the head | 175 |
| Temperature of the spinneret | 170 |

Spinnerets having 18 holes with 0.2 mm. diameter are employed. The spinning proceeds smoothly. The filaments, after stretching with a ratio of 1:5, present the following characteristics:

| | |
|---|---|
| Strength g./den | 4.3 |
| Elongation percent | 35.8 |

Skeins of the yarn thus obtained are dyed, according to the usual methods, with the following dyes Setacyl Yellow 3G (C.I. Disperse Yellow 20)
Cibacet Red B (C.I. Disperse Red 25)
Cibacet Violet RB (C.I. Disperse Violet 15)
Cibacet Scarlet G (C.I. Disperse Red 31)

The color fastness, particularly to washing and rubbing, is excellent.

*Example 3*

900 g. of prevailingly isotactic polypropylene having an intrinsic viscosity of 1, are mixed in the cold with 100 g. styrene in a Werner mixer at ordinary temperature for about 60 minutes.

The powder thus prepared is shaped at about 190° C. thus obtaining a granulated product which can be extruded according to the methods of Examples 1 and 2.

The filaments and films obtained have good dyeing characteristics.

*Example 4*

Prevailingly isotactic polypropylene having an intrinsic viscosity of 0.94, peroxidized up to a 0.27% content of OOH groups, is mixed with O-nitrostyrene in a ratio of 90 to 10, as in the preceding examples.

Spinning is carried out under the following conditions:

| | ° C. |
|---|---|
| Temperature of the screw | 210 |
| Temperature of the head | 170 |
| Temperature of the spinneret | 160 |

Permanence time of the molten mass in the extruder: 12 minutes.

Spinnerets having 18 holes with 0.2 mm. diameter are employed. The spinning proceeds smoothly. The filaments obtained are then stretched with a ratio of 1:5.

Skeins of the filaments thus obtained are dyed with the following dyes according to the usual methods:

Cibacet Red B
Setacyl Yellow 3G
Cibacet Violet RB

The colors are very fast, particularly to washing and rubbing.

*Example 5*

Prevailingly isotactic polypropylene having an intrinsic viscosity of 1.19, peroxidized up to a 0.26% content of —OOH groups is mixed with divinylbenzene, in the ratio of 90:10, as in the preceding examples.

The spinning is then carried out under the following conditions:

|  | °C. |
|---|---|
| Temperature of the screw | 190 |
| Temperature of the head | 150 |
| Temperature of the spinneret | 145 |

Permanence time of the molten mass in the extruder: 10 minutes.

Spinnerets having 18 holes with 0.2 mm. diameter are employed.

The spinning proceeds smoothly. The filaments thus obtained are stretched. Skeins of these filaments are dyed according to known methods with the following dyes:

Cibacet Violet RB
Setacyl Yellow 3G

The color fastness, particularly to washing and rubbing, is excellent.

Example 6

900 g. prevailingly isotactic polypropylene having an intrinsic viscosity of 1.26 are peroxidized with air at 75° C. until an amount of peroxidic groups corresponding to 0.22% by weight of the polypropylene are introduced into the polymer. The peroxidized polypropylene is then mixed in a ball mill at room temperature with 100 g. mono-isoamylmaleate and the mixture is melted and extruded in a melt spinning device, employing spinnerets with 18 holes having a diameter of 0.2 mm., as in previous examples.

The spinning proceeds smoothly and a yarn is obtained which is stretched with a ratio of 1:4.

The finished yarn has the following serimetric characteristics:

| Tenacity | g./den | 2.76 |
|---|---|---|
| Elongation | percent | 28 |

Skeins of the yarn thus obtained are dyed for 90 minutes at the boiling point of the bath according to known methods, with the following basic and acetate dyes:

Malachite Green GX crystals (C.I. Basic Green 4)
Astrazon Red 6B (C.I. Basic Violet 7)
(Identified by the Color Index as "Dyes for Polyacrylic Fibers)
Cibacet Red B (C.I. Disperse Red 25)
Setacyl Yellow 3G (C.I. Disperse Yellow 20)

The fastness of the obtained colors, particularly to washing and rubbing, is excellent.

Example 7

900 g. prevailingly isotactic polypropylene having an intrinsic viscosity of 1.26 are peroxidized with air at 75° C. until an amount of hydroperoxidic groups corresponding to 0.22% by weight of the polypropylene is introduced into the polymer.

The peroxidized polypropylene is then mixed in a ball mill with 100 g. diethyl maleate at ordinary temperature and the mixture is melted and extruded in a melt spinning device as in the preceding examples.

The spinning proceeds smoothly, yielding a yarn which is then stretched with a ratio of 1:6.

The finished yarn has the following serimetric characteristics:

| Tenacity | g./den | 3.9 |
|---|---|---|
| Elongation | percent | 15.6 |

Skeins of the yarn thus obtained are dyed according to known methods, i.e., at the boiling point of the bath, for 90 minutes, with the following acetate dyes:

Cibacet Red B
Setacyl Yellow 3G
Cibacet Scarlet G

The fastness of the obtained colors particularly to washing and rubbing, is excellent.

As indicated hereinabove, mixtures of modifying monomers can be incorporated with the polypropylene. Thus, a monomer which is less readily polymerizable may be used in mixture with a more readily polymerizable monomer such as acrylonitrile, methylmethacrylate or styrene, to facilitate the desired graft co-polymerization.

Since changes and variations in details may be made in practicing the invention, without departing from the spirit thereof, therefore we intend to include in the scope of the appended claims all such modifications as may be apparent to those skilled in the art.

What is claimed is:

1. A process for producing molded articles of linear, regular head-to-tail polypropylene consisting of over 50% of isotactic macromolecules having modified dyeing properties throughout the cross-section thereof, which process comprises the steps of mixing the polypropylene with from 1% to 25% by weight of a monomer selected from the group consisting of maleic acid, esters of maleic acid, halides of maleic acid, amides of maleic acid, nitrile of maleic acid, fumaric acid, esters of fumaric acid, halides of fumaric acid, amides of fumaric acid, nitrile of fumaric acid, acrylic acid, esters of acrylic acid, halides of acrylic acid, amides of acrylic acid, nitrile of acrylic acid, styrene, divinylbenzene and nitrostyrene to obtain a homogeneous mixture, heating the mixture at a temperature between about 170° C. and about 250° C. for at least five minutes to obtain a homogeneous melt, introducing the melt into an extruder in which it is maintained at a temperature between about 140° C. and 250° C. to obtain a homogeneous mass consisting of the polypropylene having short polymeric chains of the polymerizable monomer substantially uniformly distributed along and chemically bonded to the main chains of the isotactic macromolecules, and extruding said mass, at the selected temperature between about 140° C. and 250° C., through a shaping device to obtain the shaped article.

2. The process of claim 1, characterized in that from 1% to 25% by weight of styrene is mixed with the polypropylene.

3. The process according to claim 1, characterized in that from 1% to 25% by weight of divinylbenzene is mixed with the polypropylene.

4. The process according to claim 1, characterized in that from 1% to 25% by weight of nitrostyrene is mixed with the polypropylene.

5. The process according ot claim 1, characterized in that from 1% to 25% by weight of isoamyl maleate is mixed with the polypropylene.

6. The process according to claim 1, characterized in that form 1% to 25% by weight of diethyl maleate is mixed with the polypropylene.

7. The process of claim 1, characterized in that the mixture of the polypropylene and monomer is pre-formed prior to extrusion thereof to obtain the final molded article.

References Cited in the file of this patent

UNITED STATES PATENTS

| 2,200,424 | Perrin | May 14, 1940 |
|---|---|---|
| 2,837,496 | Vandenberg | June 3, 1958 |

FOREIGN PATENTS

| 507,323 | Great Britain | June 9, 1939 |
|---|---|---|

OTHER REFERENCES

Leaderman: "Elastic and Greep Properties of Filamentous Materials and Other High Polymers," The Textile Foundation (1943), pages 98 to 101 relied on.

Natta: J. Am. Chem. Soc., volume 77 (1955), pages 1708–10.